United States Patent
Waffenschmidt et al.

(10) Patent No.: US 7,554,822 B2
(45) Date of Patent: Jun. 30, 2009

(54) POWER CONVERTER FOR LED LARGE AREA LIGHT SOURCE LAMP

(75) Inventors: Eberhard Waffenschmidt, Aachen (DE); Tom Neubert, Stolberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 105 days.

(21) Appl. No.: 11/576,283

(22) PCT Filed: Sep. 27, 2005

(86) PCT No.: PCT/IB2005/053185

§ 371 (c)(1),
(2), (4) Date: Mar. 29, 2007

(87) PCT Pub. No.: WO2006/038157

PCT Pub. Date: Apr. 13, 2006

(65) Prior Publication Data

US 2008/0084167 A1   Apr. 10, 2008

(30) Foreign Application Priority Data

Oct. 1, 2004   (EP) .................................. 04104823

(51) Int. Cl.
*H02M 3/335* (2006.01)
*H05K 1/18* (2006.01)

(52) U.S. Cl. ................... 363/21.16; 363/21.08; 363/17; 363/16; 363/15; 361/764; 361/761; 361/748; 361/709

(58) Field of Classification Search ............... 363/21.02, 363/21.01, 21.03, 21.04, 21.08, 21.14, 21.15, 363/21.16, 23, 25, 39, 40, 15, 16; 315/274–289, 315/224, 225, 209 R, 247, 246, 312–326; 361/688, 704, 709, 748, 761, 764, 600
See application file for complete search history.

(56) References Cited

U.S. PATENT DOCUMENTS

| 4,277,817 | A | 7/1981 | Hehr |
| 5,003,622 | A | 3/1991 | Ma et al. |
| 5,388,040 | A | 2/1995 | Hall |
| 5,528,484 | A | 6/1996 | Hayashi |
| 5,986,895 | A | 11/1999 | Stewart et al. |

(Continued)

FOREIGN PATENT DOCUMENTS

EP   0231756 A1   8/1987

(Continued)

*Primary Examiner*—Tuyet Vo

(57) ABSTRACT

Power converter for receiving an input current at an input voltage and for providing an output current at an output voltage. The power converter comprises a transformer (133) having a primary (136) and at least one secondary (138) side, wherein the transformer shows a mutual inductivity $L_s$. The power converter further comprises at least one switching device (124a, 124b) being operated at an operating frequency $f_{op}$ at the primary side of said transformer, and a capacitor $C_S$ at the primary side of the transformer. The capacitor forms a resonant circuit with the leakage inductivity $L_S$ of said transformer, wherein said operating frequency, said capacitor $C_s$, said mutual inductivity $L_m$ and said leakage inductivity $L_S$ are matched such that the effective value of the output current is substantially constant with respect to variations of a load being traversed by said output current by using resonance principles and operating the power converter in a current source mode.

35 Claims, 6 Drawing Sheets

U.S. PATENT DOCUMENTS

| | | |
|---|---|---|
| 5,990,776 A | 11/1999 | Jitaru |
| 5,991,167 A | 11/1999 | Van Lerberghe |
| 6,344,979 B1 * | 2/2002 | Huang et al. .................. 363/16 |
| 7,133,298 B2 * | 11/2006 | Schimel ....................... 363/15 |
| 2003/0030533 A1 | 2/2003 | Waffenschmidt |
| 2003/0095027 A1 * | 5/2003 | Shu Yuen Hui et al. ..... 336/200 |
| 2007/0080652 A1 * | 4/2007 | Elferich et al. .............. 315/291 |

FOREIGN PATENT DOCUMENTS

| | | |
|---|---|---|
| EP | 0267108 A1 | 5/1988 |
| EP | 1221753 A2 | 7/2002 |

* cited by examiner

POWER CONVERTER FOR LED LARGE AREA LIGHT SOURCE LAMP

FIELD OF THE INVENTION

The present invention relates generally to power converters, and more particularly to a power converter for a Large Area Light Source (LALS) lamp comprising Light Emitting Diodes (LED) as illuminants. As a result, the converter is thin enough for integration in thin devices.

BACKGROUND OF THE INVENTION

Electronic industry faces an increasing pressure towards miniaturization and cost savings. Especially in the consumer electronics sector, manufacturers strive for being able to manufacture products for their clients as small, flat, and compact as possible.

In the microelectronics domain, an enormous miniaturization, along with an automation of the manufacturing process could be achieved by integration of components in microchips. In the power electronics domain, construction volume and weight of circuits could be successfully reduced in the past, due to the development of switching mode power supplies (SMPS). In particular, the transfer of power using resonant converter topologies lead to very efficient and small solution. Yet, it would be desirable to integrate discrete components of the circuit, in particular for very thin and flat applications, such as plasma displays or LCD displays, further increasing the degree of miniaturization and automation.

However, integration is more difficult to achieve for circuits in power electronics applications. In particular, the differences of types of components are a reason for using discrete components to date. In addition, size reduction of these components is limited, because often a certain volume is required for storing a certain amount of energy, or to keep electrical losses reasonable.

Control systems for regulating output voltage and output current also contribute to the power converter's complexity and limit its possibilities for integration.

Power converters that are to be connected to a mains supply net (e.g. 230V AC/50 Hz in Europe, or 110 V AC/60 Hz in the United States), must comply with regulations of the operator of the mains supply net regarding power factor and mains harmonics.

SUMMARY OF THE INVENTION

According to a preferred embodiment of the invention, a power converter for receiving an input current at an input voltage and for providing an output current at an output voltage comprises a transformer having a primary and a at least one secondary side, the transformer showing a mutual inductivity $L_m$ and a leakage inductivity $L_s$. The transformer also comprises at least one switching device being operated at an operating frequency $f_{op}$ at the primary side of the transformer, and a capacitor $C_s$ forming a resonant circuit with the leakage inductivity $L_s$ of the transformer. The operating frequency, the capacitor $C_s$ and the leakage inductivity $L_s$ are matched such that the effective value of the output current is substantially constant with respect to variations of a load being traversed by the output current. This condition of a constant output current is for example fulfilled, if in a frequency response function of the output current a dependency from the load is negligible. The condition is also fulfilled, if an addend depending on the load is smaller, according to absolute value, by at least one order of magnitude than any other addend in a corresponding sum. In terms of a current characteristic as a function of the load, the slope of this characteristic is a measure for the degree to which the load current is sensible to variations of the load. At resonance, this sensibility is quite small. Slightly off the resonance, the output voltage of the working point affects the sensibility, too. If measures for limiting the voltage are provided, a smooth transition in the vicinity of the voltage limit exists. In this manner, a substantially self-regulating behavior for the output current can be achieved. The resonant converter is used in a current source mode, in which, by using resonance principles, the current is kept within narrow limits without control effort. Hence, a stable behavior of the power converter with respect to variations of the load is achieved. Indeed, the current supplied to the load is affected by the load to a limited extend, only. The current is rather determined by the frequency-response curve of the resonance circuit.

The operating frequency $f_{op}$, the capacitor $C_s$, and the leakage inductivity $L_s$ may be matched according to a lower bound for the operating frequency being a basic resonance frequency defined by the series capacitor and the sum of the mutual inductivity $L_m$ and the leakage inductivity $L_s$, such that $$f_{op} > \frac{1}{2\pi} \frac{1}{\sqrt{(L_m + L_s)C_s}}.$$

Operated at this basic resonance frequency, the power converter acts much like a current source at its secondary side, resulting in a high output impedance. Furthermore, at this basic resonance frequency the input impedance of the resonance circuit changes from a capacitive mode to an inductive mode with increasing frequency. Certain switching devices, such as MOSFET transistors are preferably operated driving an inductive charge in order to keep switching losses small. In addition, passive components such as capacities and inductivities can be kept small, since the required basic resonance frequency can be chosen rather high. Indeed, the maximal operating frequency is mainly limited by the switching devices. For this reason, an unlimited increase of the operating frequency is not possible at reasonable cost. Therefore, the values of the series capacitor $C_s$ and the leakage inductivity $L_s$ have to be matched to the imposed operating frequency.

The operating frequency $f_{op}$, the capacitor $C_s$, and the leakage inductivity $L_s$ may also be matched according to an upper bound for the operating frequency at which an output impedance of said resonant circuit is substantially matched to said load. In order to maintain the current source characteristic of the power converter, a relatively high output impedance has to be maintained. The point of power matching between output impedance and load can be regarded as the transition point between a current source and a voltage source. Therefore, keeping the output impedance greater than the load yields a current source. In this frequency region, the output impedance decreases with increasing frequency. In practice, the upper bound can be chosen at a frequency, at which the output impedance becomes smaller than e.g. 1.2 times the load impedance, which still yields a satisfactory current source character.

The operating frequency $f_{op}$, the capacitor $C_s$, and the leakage inductivity $L_s$ may be matched according to an upper bound for said operating frequency, such that $$f_{op} < \frac{1}{2\pi} \frac{1}{\sqrt{L_s C_s}}.$$

At this so-called series resonance frequency, the output impedance of the power converter is minimal and may even vanish. However, as a function of the frequency, the output impedance increases rapidly around this series resonance frequency. Therefore, even at frequencies that are only slightly below the series resonance frequency, a satisfactory value of the output impedance may be achieved.

The operating frequency may be chosen substantially higher than a series resonance frequency defined by the series capacitor and the leakage inductivity $L_s$ as $$f_s = \frac{1}{2\pi} \frac{1}{\sqrt{L_s C_s}},$$

such that the leakage inductivity $L_s$ limits said output current. In other words, the operating frequency is chosen in a region in which the leakage inductivity $L_s$ is a predominant limiting factor for the output current. An inductivity connected in series will act as a current choke for increasing frequency due to the relation: $Z_{inductivity} = j\omega L$, expressing that the absolute impedance value of an inductivity L is proportional to the frequency. The leakage inductivity can be considered to be predominant, if its absolute impedance value exceeds the absolute value of the sum of the impedances of all other components in a respective series wiring. In this frequency region, a series inductivity becomes predominant and can be considered as an almost loss less series AC resistance. If the output resistance is not too high, the output current is nearly independent of the load.

Furthermore, the operating frequency $f_{op}$, the capacitor $C_s$, and the leakage inductivity $L_s$ may be matched such that an input impedance of said resonant circuit presents an inductive character. Even at a short circuit, the converter operates in the inductive mode, which is desirable to achieve lossless zero-voltage switching of the switching devices.

The transformer may be a planar transformer, which has the advantage of a reduced installation height.

The leakage inductivity $L_s$ may be realized by shifting the center of a spiral primary winding of the transformer with respect to the center of a spiral secondary winding of the transformer. Alternatively, the leakage inductivity $L_s$ may be realized by different dimensions of said primary and secondary windings of said transformer. A combination of both is also possible. While the first of the described possibilities to realize a leakage inductivity is well suited to determine or change the necessary geometry experimentally or as part of a fine-adjustment during assembly of the switching-mode power supply, the second possibility allows for a relatively easy calculation and the losses caused by the magnetic flux are more homogeneous distributed. When both possibilities are combined, the major part of the leakage inductivity $L_s$ may be realized according to the second method and any necessary fine adjustment during assembly and final inspection may be achieved by the first method. The described shifting method can be applied to planar transformers, only.

The primary and secondary windings of the transformer may be integrated in a printed circuit board, PCB, in a planar manner and a solid PCB layer may be disposed between the primary and secondary windings. The transformer is at the same time indispensable and constraint to have certain minimal dimensions. An integration of the transformer in the PCB combines both requirements. Effective electrical insulation between the primary and the secondary winding is achieved by a solid PCB layer between both windings.

Adjacent to the flat side of the arrangement consisting of primary windings, solid PCB layer, and secondary winding, planar magnetic cores may disposed. Guiding the magnetic flux of the transformer inside a soft magnetic material is preferable for obtaining an efficient coupling between primary and secondary windings. With the proposed arrangement, the magnetic flux is guided nearby around the windings.

The planar softmagnetic cores may consist of ferrite tiles, ferrite polymer compound, or highly permeable metal foil. In the case of a highly permeable metal foil the same may be made from NiFe or a mu-metal. Alternatively, the magnetic cores may be made from amorphous iron or nanocrystalline iron. Amorphous iron can be e.g. Metgalas or Vitrovac. The magnetic cores may be structured by providing slots in the magnetic cores, the slots being parallel to magnetic field lines guided within the magnetic cores. These materials provide good soft magnetic characteristics at reduced space requirements. Providing slots in the magnetic cores helps reducing eddy currents. Ferrite tiles can be manufactured with a very small thickness, thereby keeping the total thickness of the PCB small, as well. A ferrite polymer compound material can be manufactured in more complex forms and shapes.

The capacitor $C_s$ may be integrated in the PCB, leading to savings of space due to moving of large components, such as the capacitor $C_s$, from the PCB surface to its interior, which leads to a lower number of components at the surface of the PCB.

According to another embodiment of the present invention, the power converter of the electric device is mounted in a grove milled at one side of a heat sink, and the PCB of the power converter is mounted directly to the heat sink, in order to improve cooling of the PCB and its integrated and mounted components. Also, the power supply does not add any thickness to the entire arrangement of LED array, heat sink and power converter.

In addition, the PCB may be made from a thermally highly conducting material, which further improves cooling of electronic components, in particular those components integrated in the PCB.

Capacitors having high nominal values may be avoided, since these tend to require ample space for their integration. For the same reason, electrolytic capacitors may be avoided. Large capacitors typically serve two purposes in a power supply. For one thing, they are typically used to reduce a so-called ripple voltage at an output of a rectifier. If the specification requires the ripple voltage to be small, a large capacitor is necessary. For another thing, large capacitors are typically needed to form resonance circuits having low resonance frequencies. In a particular embodiment, no capacitors has a nominal value exceeding 1 µF. Furthermore, since in the target application a ripple voltage of considerable amount is permitted, capacitors that are usually needed to maintain a constant flow of energy also during zero crossings of the supply voltage can be economized. The remaining capacitors filter the higher switching frequencies, and do not need to be very large for this reason.

In one embodiment, the power converter may further comprise
a first AC-to-DC rectifier connectable to an AC mains supply; and a second AC-to-DC rectifier connectable to an electric consumer. With these additions, the power converter becomes a switching mode power supply for providing a DC electrical consumer with electrical power from an AC mains supply network. This assures that an electrical consumer requiring direct current (DC) can be connected to an alternating current (AC) supply network by means of an intermediary transformation stage operating at another frequency than the AC supply network. Usually, the intermediary stage operates at a higher frequency than the AC supply network.

The first AC-to-DC rectifier may produce a rectified voltage and a superposed ripple voltage. The ripple voltage may have a frequency that is the double of the frequency of a voltage of the AC mains supply. Furthermore, the current drawn by the first AC-to-DC rectifier from the AC mains supply may be substantially sinusoidal with a frequency equal to the frequency of the voltage of the AC mains supply. With certain electric consumers, especially those having a non-linear current-voltage characteristic, providing a ripple voltage at a frequency that is the double of the frequency of the AC mains supply, may be beneficial with respect to power consumption periodicity. Since commonly known rectifiers produce such a ripple voltage as a side product, no additional measures are needed, neither for the production nor for the suppression of the ripple voltage. The current drawn by the first AC-to-DC rectifier from the AC mains supply is substantially sinusoidal with a frequency equal to the frequency of the voltage of the AC mains supply. In this manner, a major requirement of the power supply industry is met. In fact, the power supply industry requires that electric devices connected to their supply network do not charge the network excessively with mains harmonics.

The electric consumer may have a diode-like current-voltage characteristic, by which, in collaboration with the first AC-to-DC rectifier, a power consumption of the electric device can be achieved that varies at twice the frequency of the voltage of the AC mains supply. The power converter draws an essentially sinusoidal current from the AC mains supply at a frequency equal to that of the voltage at said AC mains supply. The power converter therefore fulfils the power supply industry's requirement of mains harmonics reduction resulting in a reduction of losses in and stress on the electrical supply network. This is achieved by taking advantage of above mentioned current-voltage characteristic of the load, leading to a power consumption that oscillates in a sinusoidal manner at the same frequency as the current flowing through it. Furthermore, the current-voltage characteristic of the electric consumer leads to a power consumption at the frequency of the current flowing through it. Since in stationary operation of the electric device the amount of power consumed in the electric consumer approximately equals the amount of power absorbed from the mains supply, and since the internal switching frequency is several orders of magnitude higher than the mains supply voltage frequency, the power absorbed by the power supply essentially oscillates at the frequency of the ripple voltage. Such a behavior is preferable, because, from the power supply industry's point of view, it looks like a linear load that does not stress the power supply network excessively because of almost no mains harmonics.

A Large Area Light Source (LALS) lamp may comprise a power converter according to the invention. This allows the Large Area Light Source lamp to be thin, even if the power converter is integrated in the heat sink of the lamp.

BRIEF DESCRIPTIONS OF THE DRAWINGS

Other objects and advantages of the invention will be come apparent and upon reference to the drawings, in which.

Figure 1:
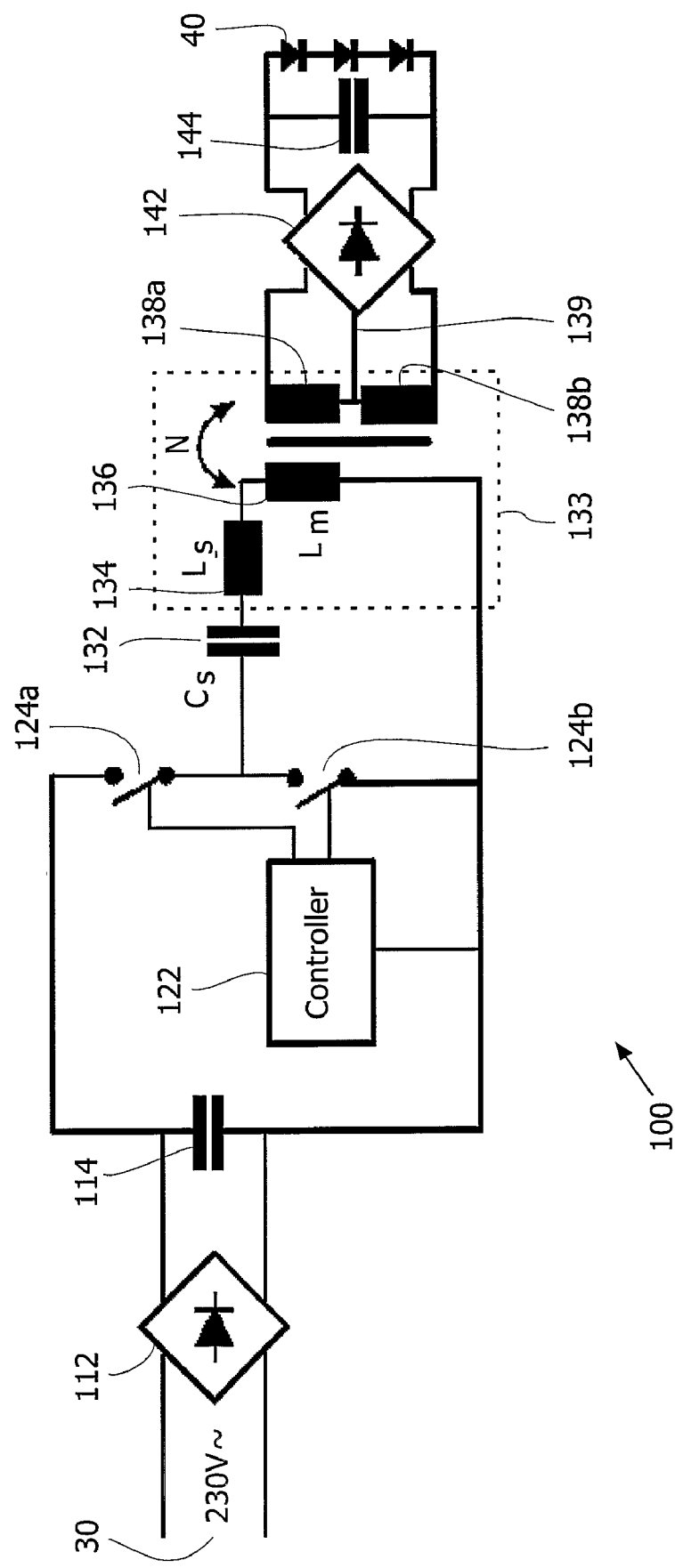
FIG. 1 shows a schematic representation of a power converter employing the present invention.

While the invention is susceptible to various modification and alternative forms, specific embodiments thereof have been shown by way of example in the drawings and will herein be described in detail. It should be understood, however, that it is not intended to limit the invention to the particular forms disclosed, but on the contrary, the invention is to cover all modifications, equivalents, and alternatives as defined by the appended claims.

DESCRIPTION OF THE PREFERRED EMBODIMENTS

Referring now to FIG. 1, there is shown a schematic diagram of a power converter (100) for adapting the power supplied by a mains supply net (30) to the operating conditions of an electrical consumer (40). This adaptation comprises reduction of the voltage and rectifying an AC current supplied by the mains supply net (30) to a DC current required by the electrical consumer (40). The mains supply net may provide a 230V AC/50 Hz voltage, such as provided by European mains supply networks, but may equally be a voltage provided by some other mains supply net, such as an United States mains supply net, i.e. a 110V AC/60 Hz voltage. In this embodiment, the electrical consumer (40) consists of several Light Emitting Diodes (LED's), connected in series. Due to their current-voltage characteristic, diodes tend to maintain a voltage at their terminals that is in the vicinity of their predetermined forward voltage. The intensity of a current flowing through a diode, on the other hand, is practically not controlled by the diode itself, and can attain high values, unless the surrounding circuit provides appropriate countermeasures to limit the intensity of the current. Traditionally, feedback control loops are used for controlling the current flowing through the load. Such a feedback control usually acts on the gating signal that is applied to the gates or the bases of the switching elements by means of a pulse width modulation (PWM). However, if the width of the gating signal is used as a control factor, at least one of the instants of turning on or turning off of the switching devices cannot be chosen consistent with the requirement of zero-voltage switching (ZVS) or zero-current switching (ZCS). As a result of these sub-optimal instants of turn-on and/or turn-off, power dissipation in the switching elements increases. Another possibility for controlling the output current of a power converter in an active manner consists in taking advantage of the frequency response of the output current. Accordingly, the operating frequency for the switching elements varies around a working frequency at which the frequency response curve of the output current presents a slope. All feedback controls have in common that the output current of the power converter needs to be measured, which requires additional circuitry. If galvanic isolation is required between primary and secondary sides of the transformer, additional optical or electromagnetic transmission elements become necessary. However, contrary to popular opinion, sufficiently stable current control may be achieved without closed loop control as will be described in this document.

The electrical voltage provided by mains supply net (30) is rectified by a rectifier (112). A capacitor (114) smoothes the rectified voltage, wherein the degree of smoothness depends on the capacity of capacitor (114). The voltage between the terminals of capacitor (114) comprises a direct component and a so-called ripple voltage. The rectified voltage is applied to a half bridge comprising switches (124a) and (124b). Both switches are operated in an alternating manner and are, to this end, controlled by a controller (122). The controller (122) generates gate signals or trigger signals for switches (124a) and (124b). Switches (124a) and (124b) can be realized either in bipolar or in MOSFET technology. For higher operating frequencies, MOSFET transistors are usually preferred over bipolar transistors. At the output of the half bridge, an essentially square wave voltage is available, which is applied to a resonant network comprising a capacitor $C_s$ (132) and inductivities $L_s$ (134) and $L_m$ (136). These components form a series resonant circuit. The inductance $L_s$ (134) is the leakage inductance of a transformer (133) and the inductance $L_m$ (136) is the mutual inductance of the same transformer (133). Transformer (133) also comprises secondary windings (138a) and (138b) at its secondary side. In a well known manner, transformer (133) is provided with a center tap (139). A rectifier (142) is connected to the secondary side of transformer (133). A capacitor (144) is used for smoothing the output voltage of rectifier (142). Connected in parallel to capacitor (144) is the load (40), which is supplied by the smoothed output voltage of rectifier (142).

To make the circuit thin, the transformer (133) is constructed with its windings integrated in the printed circuit board (PCB).

Figure 2:
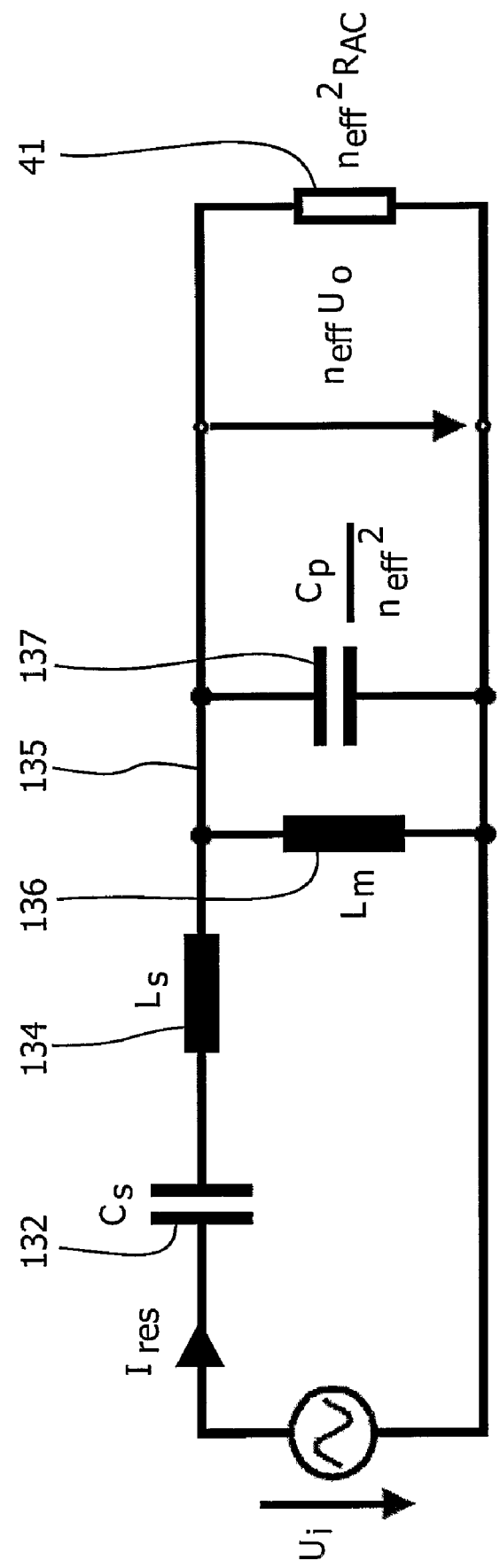
FIG. 2 shows an equivalent network of the power converter facilitating its analysis.

Turning now to FIG. 2, an equivalent network of the relevant part of the power converter is represented. The output of the half bridge is simulated by means of a voltage source $U_{HB}$ providing a square wave voltage. This square wave voltage is supplied to a resonant circuit similar to the one depicted in FIG. 1. In addition to the resonant circuit represented in FIG. 1, a capacitor $C_p$ (137) is connected in parallel to the output of an ideal transducer (135). In fact, capacitor $C_p$ (137) models a parasitic capacitance at the secondary side of transformer (133), caused by its windings. When transformed to the primary side of the transformer, capacitor $C_p$ (137) appears on the primary side of the ideal transducer as $C_p/N^2$, wherein N is the turns ratio of secondary winding and primary winding. Because of this turns ration dependency, even a small parasitic capacitance at the secondary side of transformer can become relevant at its primary side, depending on the turns ratio N. Accordingly, parallel capacitor cannot be neglected in an analysis of the circuit. The occurrence of capacitor $C_p$ (137) results in a parallel resonant circuit consisting of $L_m$ (136) and capacitor $C_p$ (137), transformed to the primary side of the transducer (135). Together with the series resonant circuit consisting of capacitor $C_s$ (132) and leakage inductance $L_s$ (134), this leads to a fourth order resonant circuit. This circuit topology is also called LLCC topology, due to the number of its components.

In order to analyze the LLCC half bridge converter more closely and to understand the different modes of operation, it is helpful to use a model allowing abstraction of the complex interrelationships. An appropriate tool for analysis is the so called First Harmonic Approximation (FHA), in which only a fundamental frequency of a signal that is applied to a network is considered. This is admissible, if the major part of the transferred energy is transported in the wave of fundamental frequency. All contributions of harmonic waves are to be neglected. In an electric circuit comprising linear components, only straightforward AC-circuit analysis at fundamental frequency needs to be performed. Using AC calculation methods, the behavior of the LLCC resonant converter can be analyzed. A common approach is the calculation of the transfer function by means of a voltage divider, according to the formula:

$$\frac{n_{\mathit{eff}} \cdot U_o}{U_i} = \frac{Z_2}{Z_1 + Z_2}$$

In this formula, $U_o$ designates the output voltage, $U_i$ the input voltage, and $n_{\mathit{eff}}$ the effective turns ratio. Impedances $Z_1$ and $Z_2$ are defined as:

$$Z_1 = \frac{1}{j\omega C_s} + j\omega L_s$$

and $$Z_2 = \frac{1}{\frac{1}{j\omega L_p} + \frac{j\omega C_p}{n_{\mathit{eff}}^2} + \frac{1}{n_{\mathit{eff}}^2 \cdot R_{AC}}},$$

respectively. With the definition of the quality factor $$Q_s = \frac{\omega_s \cdot L_s}{R_L} = \frac{\omega_s \cdot L_s \cdot P_{out}}{U_{out}^2} = \sqrt{\frac{L_s}{C_s}} \cdot \frac{P_{out}}{U_{out}^2}$$

and the definitions of the series resonance frequency and the parallel resonance frequency $$f_s = \frac{\omega_s}{2\pi} = \frac{1}{2\pi\sqrt{L_s C_s}}$$

-continued
and $$f_p = \frac{\omega_p}{2\pi} = \frac{1}{2\pi\sqrt{L_p C_p}},$$

respectively, the absolute value transfer function of the LLCC converter is found as $$\left|\frac{U_{out}}{U_{in}}\right| = \frac{\frac{1}{2 \cdot n_{\mathit{eff}}}}{\sqrt{\left(1 + \frac{L_s}{L_p} \cdot \left[\left(\left(\frac{f_s}{f_p}\right)^2 + 1\right) - \left(\left(\frac{f_s}{f}\right)^2 + \frac{1}{n_{\mathit{eff}}^2}\left(\frac{f}{f_p}\right)^2\right)\right]\right)^2 + Q_s^2 \cdot \frac{\pi^4}{n_{\mathit{eff}}^4 \cdot 64}\left(\frac{f}{f_s} - \frac{f_s}{f}\right)}}$$

From this equation follows that the transfer function of the circuit is substantially determined by the choice of the quality factor $Q_s$, the resonance frequencies $f_s$ and $f_p$, and the ratio of $L_s$ and $L_p$.

Figure 3:
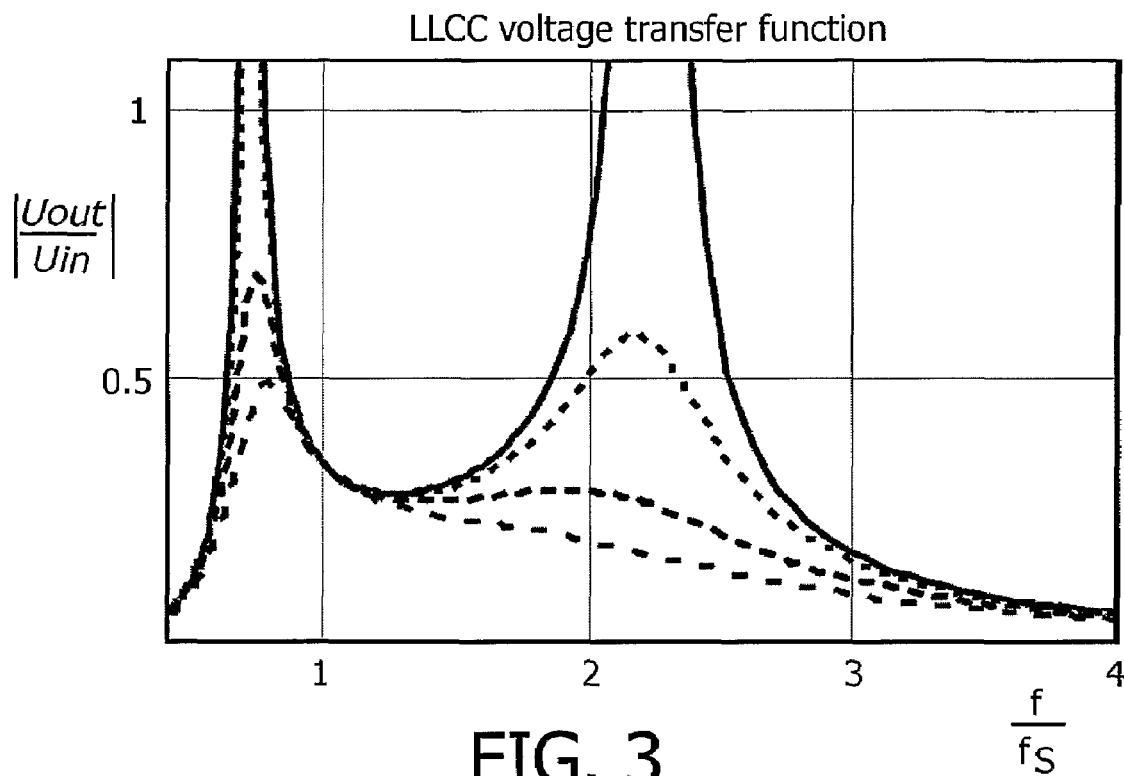
FIG. 3 shows the frequency response of the voltage transfer function $|U_{out}/U_{in}|$ as a function of the normalized frequency f.

FIG. 3 shows a diagram representing the voltage transfer function of the converter as a function of the frequency. The frequency axis of the diagram is standardized to the series resonance frequency $f_s$. Each of the curves shown in the diagram of FIG. 3 shows the voltage ratio for a particular quality factor $Q_s$. Quality factor $Q_s$ is a function of load resistance $R_L$, which, in turn, determines the output power of the converter. Starting from the bottom, the lowermost, coarsely dashed curve represents the circuit behavior for maximal output power, and the next, dashed curve the behavior for nominal output power. The next, dotted curve shows the circuits behavior for low output power. The uppermost, solid curve shows the voltage transfer function for operation at light load.

A resonant converter can be operated in different modes, which can be adjusted by choosing the operating frequency. By means of a First Harmonic Approximation and the transfer function of a converter topology resulting therefrom, the transfer behavior of the circuit can be examined. Different operating ranges can be discerned. The transfer function features two characteristic resonance frequencies, $f_{r1}$ and $f_{r2}$, at the local maxima of the curves. It should be noted that these resonance frequencies $f_{r1}$ and $f_{r2}$ are in general different from the series and parallel resonance frequencies. Observing the transfer function, it is noticeable that the maxima of the load curves are displaced. For small load, the maximum moves towards $f_{r1}$. For increasing loads, the peak moves towards the series resonance frequency $f_s$. The extend of influence of the resonance frequency $f_{r2}$ depends on the converter design.

The following operating ranges, which depend on the location of the maxima of the load curves, can be determined:

capacitive range: The input impedance acts like a capacitor. The current precedes the voltage. The switching elements (e.g. IGBTs) are preferably switched off at instants when no current flows through the switching element (zero-current-switching or ZCS);

inductive range: The input impedance acts like an inductance. The voltage precedes the current. The switching elements (e.g. MOSFETs) are preferably switched on at instants, when the voltage at the switching element is zero (zero-voltage-switching or ZVS).

If the converter is to operate in the capacitive range, then the switching frequency has to be chosen below the resonance frequencies. In this range, the switching elements can be switched off without a current flowing through them. Operated above the resonance frequencies, the converter functions in an inductive mode, i.e. the switching elements can be switched on at zero voltage. The series resonance frequency $f_s$ is the barrier frequency between both resonance frequencies and presents yet another transition from the capacitive mode of operation to the inductive mode of operation.

The lower of the resonance frequencies is the fundamental frequency. It is determined by the series capacity and the sum of the leakage inductance and the mutual inductance. At this frequency, the converter acts like a current source at its output, i.e. the output impedance is very high. Beneath this frequency, the converter functions in a capacitive mode. Above this frequency, depending on the load condition, the converter functions in an inductive mode.

The second major resonance frequency is the series resonance frequency, which is determined by the series capacity $C_s$ and the leakage inductivity $L_s$. At this frequency, the converter functions as a voltage source. Accordingly, its output impedance is very low. This range has to be avoided, in case the converter is intended to drive LED's. Well above the series resonance frequency, the series inductivity limits the load current so that this range may be used to drive LED's, as well.

Figure 4:
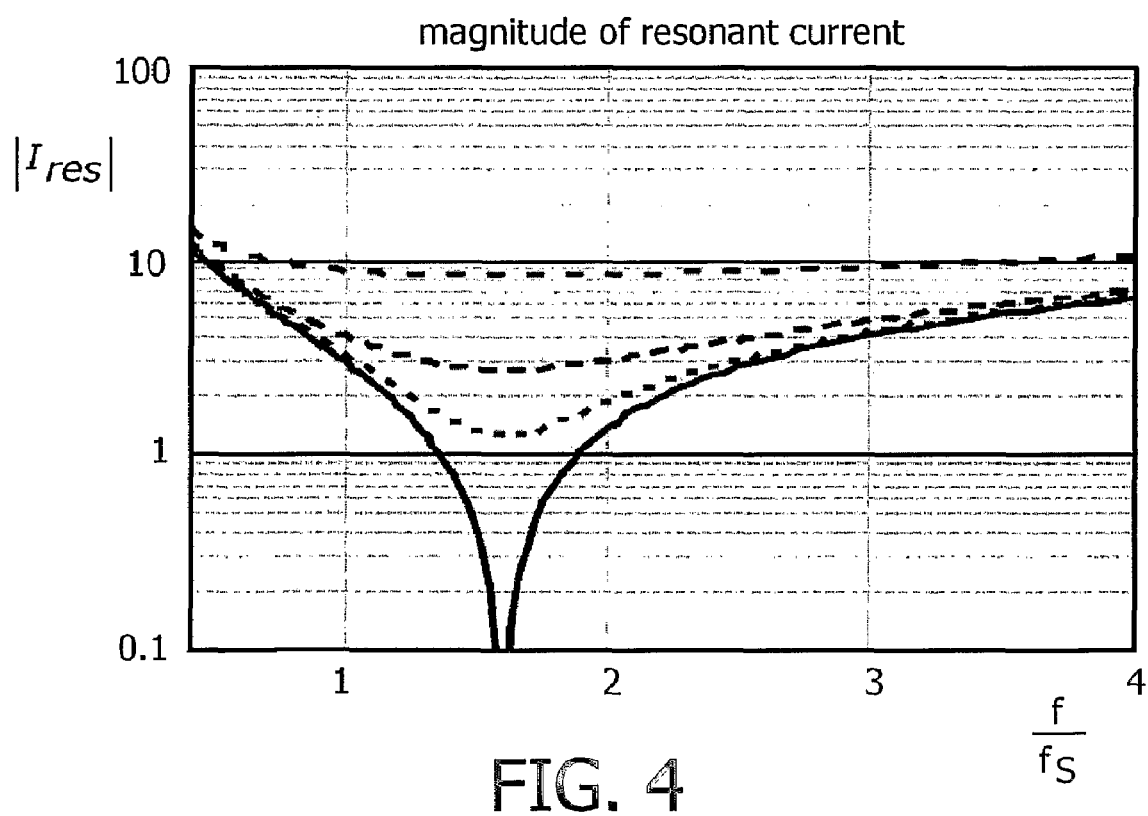
FIG. 4 shows the frequency response of the magnitude of the resonant current $I_{res}$.
Figure 5:
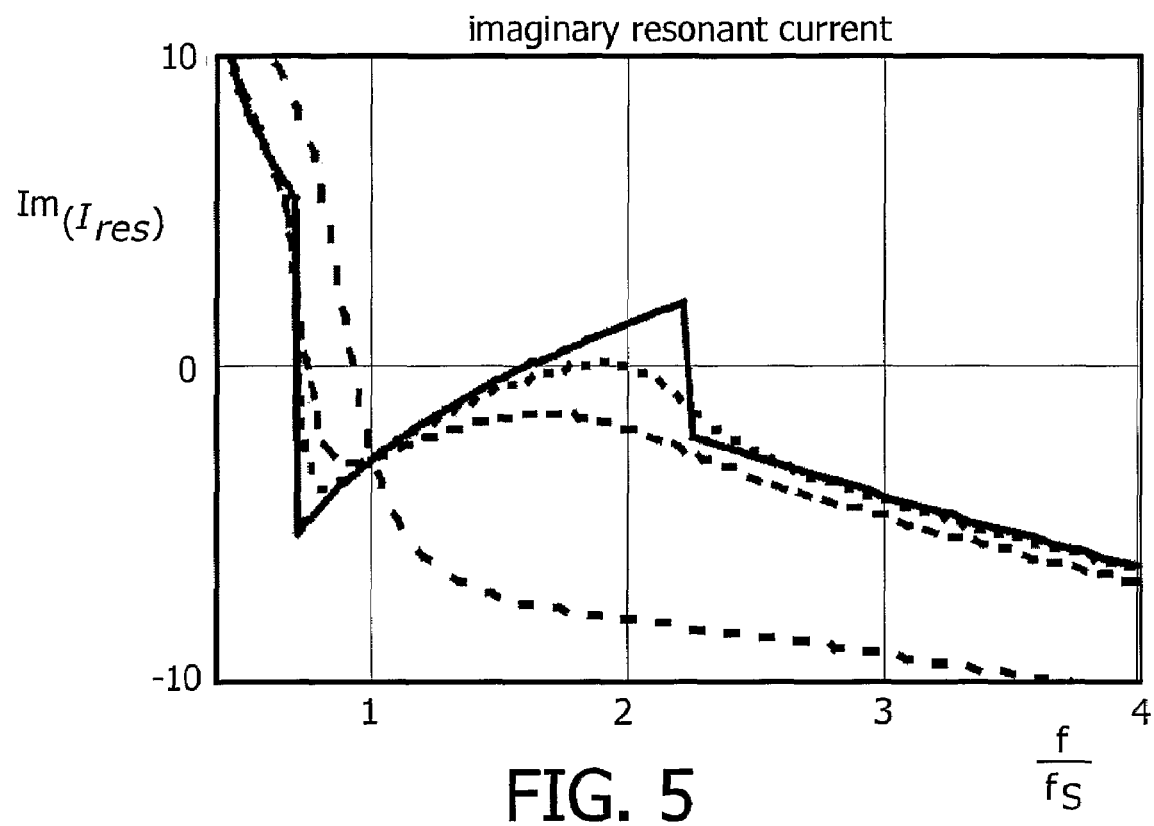
FIG. 5 shows the frequency response of the imaginary part of the resonant current, $Im(I_{res})$, as a function of the normalized frequency f.
Figure 6:
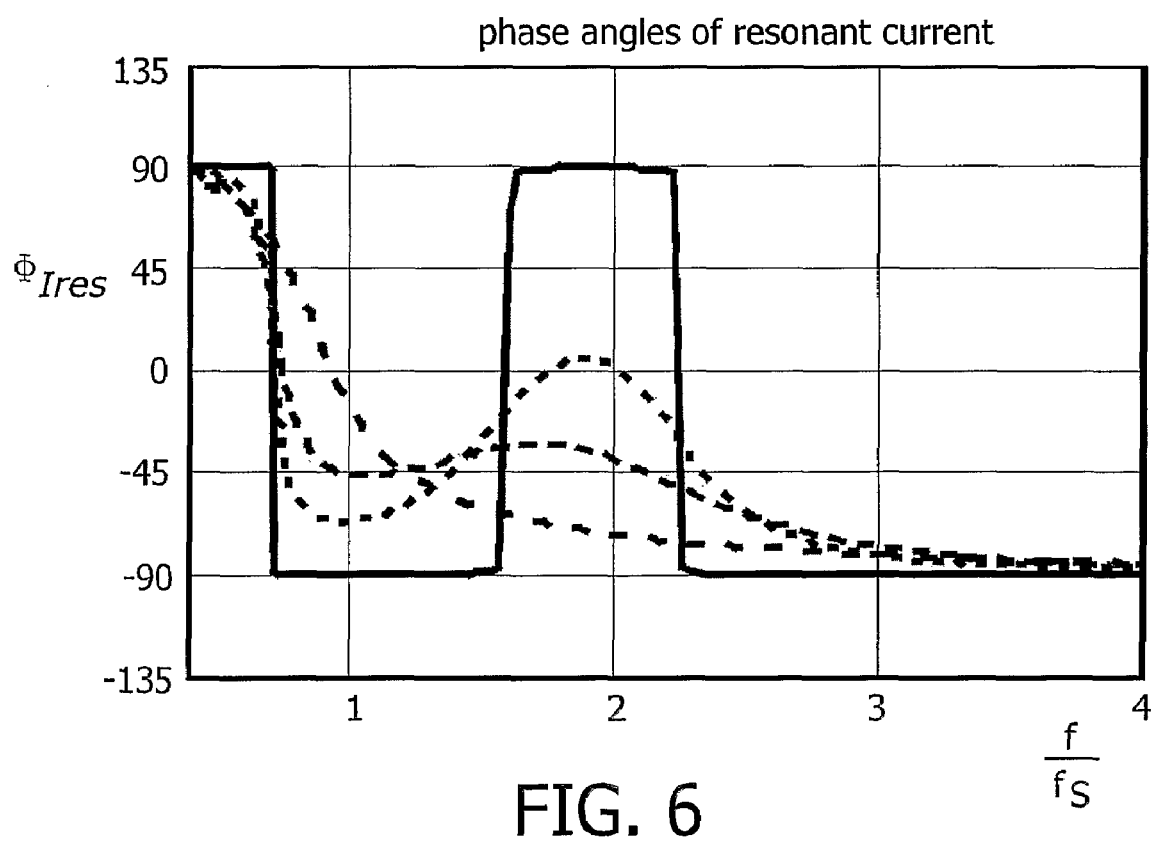
FIG. 6 shows the frequency response of the phase of the resonant current $I_{res}$ of the circuit as a function of the normalized frequency f.

Considering the current in the resonant circuit, the different ranges of operation of the converter can be determined more precisely. To this end, both the magnitude and the phase of the current in the resonance circuit $I_{res}$ is plotted against the frequency in FIG. 4 and FIG. 6, respectively. For operation at light load conditions (solid line) it is recognizable that the converter can function in two capacitive and two inductive modes. Resonance frequency $f_{r1}$ marks the transition from the capacitive to the inductive range. Accordingly, the phase changes from +90° to −90°, i.e. the voltage precedes the current in the resonance circuit. At the parallel resonance frequency, which results from the elements in the parallel branch $L_p$ and $C_p$, the current becomes capacitive again. At this point no current flows into the resonance circuit under light load conditions as can be taken from the magnitude diagram. The switching transistors do not produce any forward losses at this operating frequency. At resonance frequency $f_{r2}$ the converter becomes inductive and a relatively high current flows in the resonance circuit. The usability of the converter for zero-voltage-switching (ZVS) depends on the value of the imaginary component of the resonance current, which is linked to the phase of the current and therefore to the delay or the advance of the current with respect to the voltage. FIG. 5 shows the imaginary component of the current. The more negative the current is in the instance when the voltage crosses zero, the more advantageous this is for ZVS since the capacitances of the switching element can be better decharged and recharged. The zero-crossings of the imaginary part of the current in the frequency behavior diagram represent the transitions to the different modes of operation. Furthermore, it is visible that the imaginary part of the current is constant at the so-called load-independent point. This means that the converter presents the same ZVS behavior when operating in the inductive more, regardless of the load. Due to the unsatisfactory control behavior of the output voltage, operation at this frequency should only be chosen, if a relatively stable input voltage can be assumed.

Figure 7:
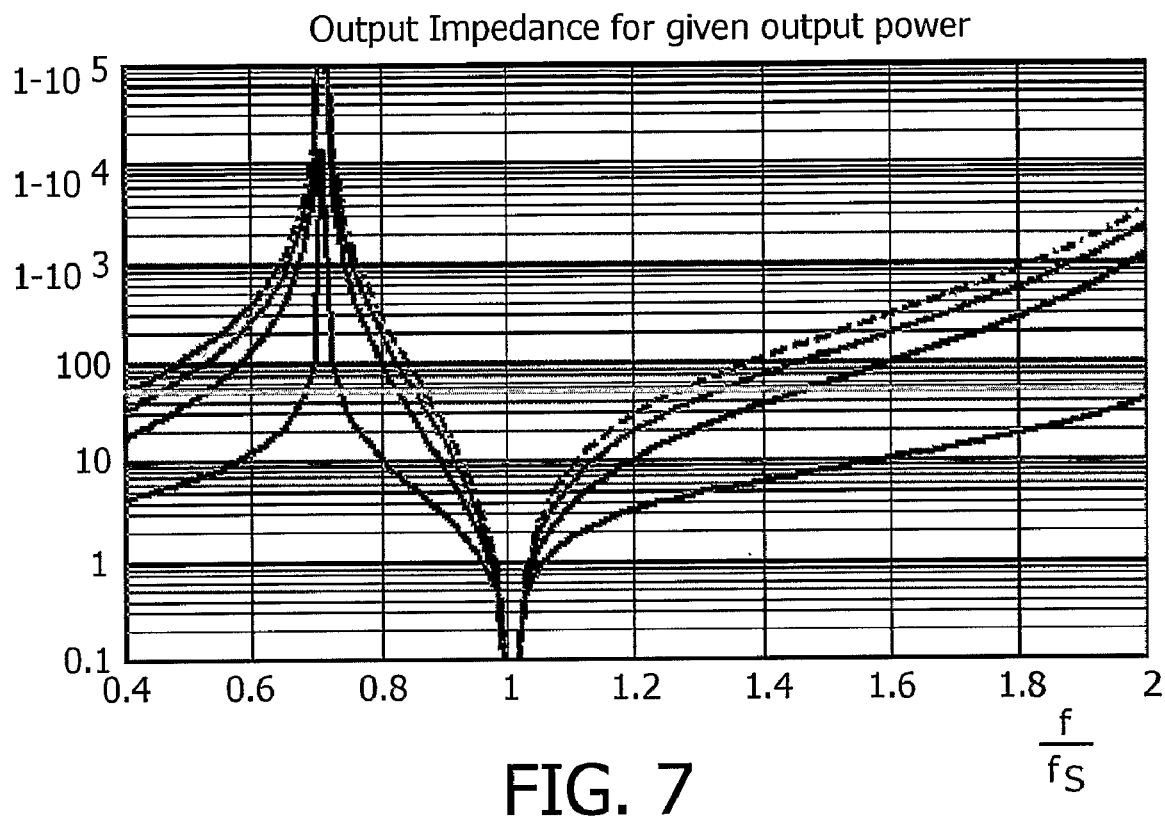
FIG. 7 shows the frequency response of the output impedance of the power converter as a function of the normalized frequency f.

In addition, it may be desirable to design the converter as a constant current source or as a constant voltage source. To this end, the output impedance of the LLCC converter is represented in FIG. 7 for different values of the output power.

Again, the representation is normalized to the series resonance frequency $f_s$. Operated at this series resonance frequency, the output resonance of the converter becomes very small, i.e. the circuit represents a constant voltage source. In contrast, the circuit acts like a constant current source for a working frequency equal to the parallel resonance frequency. Between both frequencies, the output impedance assumes finite values, which makes it possible to perform a power adjustment by choosing an appropriate working frequency.

Figure 8A:
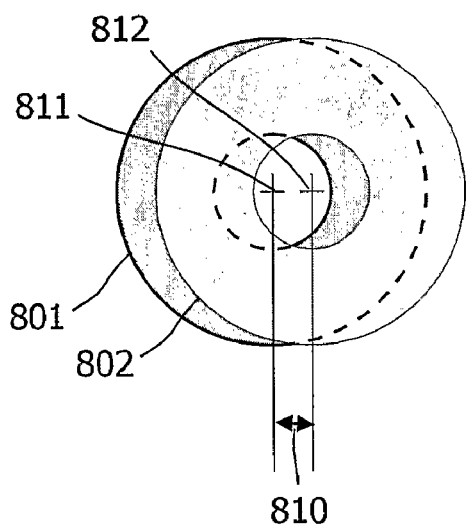
FIG. 8a shows an arrangement of the primary winding and the secondary winding of a transformer in which a leakage inductivity is achieved by shifting the centers of both windings.
Figure 8B:
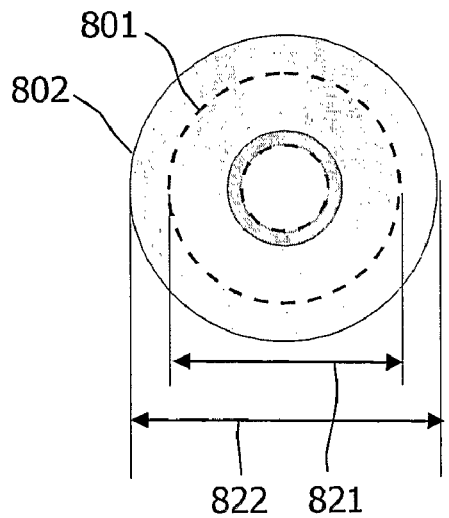
FIG. 8b shows a primary winding and an secondary winding of a transformer, in which the leakage inductivity is achieved by assigning different diameters to the primary winding and the secondary winding.

The series inductivity $L_s$ is realized by the leakage inductivity of the transformer. To increase and adjust it to a desired value in a planar transformer suited for this application, there are two possibilities proposed. In the first possibility, the primary and the secondary winding are spiral windings with equal diameter. As can be seen in FIG. 8a, their centers are shifted. Primary winding 801 has a center 811 and secondary winding 802 has a center 812. A distance 810 between the centers 811 and 812 defines the displacement of the secondary winding with respect to the primary winding. The more the centers are shifted, the weaker is the coupling and thus the leakage inductivity increases. This method is well suited to determine or change the necessary geometry experimentally. The second possibility also uses two spiral windings. They are centered to each other, but they have different diameters, as can be seen in FIG. 8b. The diameter 821 of the primary winding 801 is smaller than the diameter 822 of the secondary winding 802. The parts that do not overlap are weakly coupled to the rest of the winding and thus the leakage inductivity is increased. This configuration can be calculated more easily compared to the first solution and the losses caused by the magnetic flux are more homogeneously distributed. However, this solution cannot be modified after the fabrication and no experimental adjustment is possible. Also, a combination of both possibilities is possible.

Figure 9:
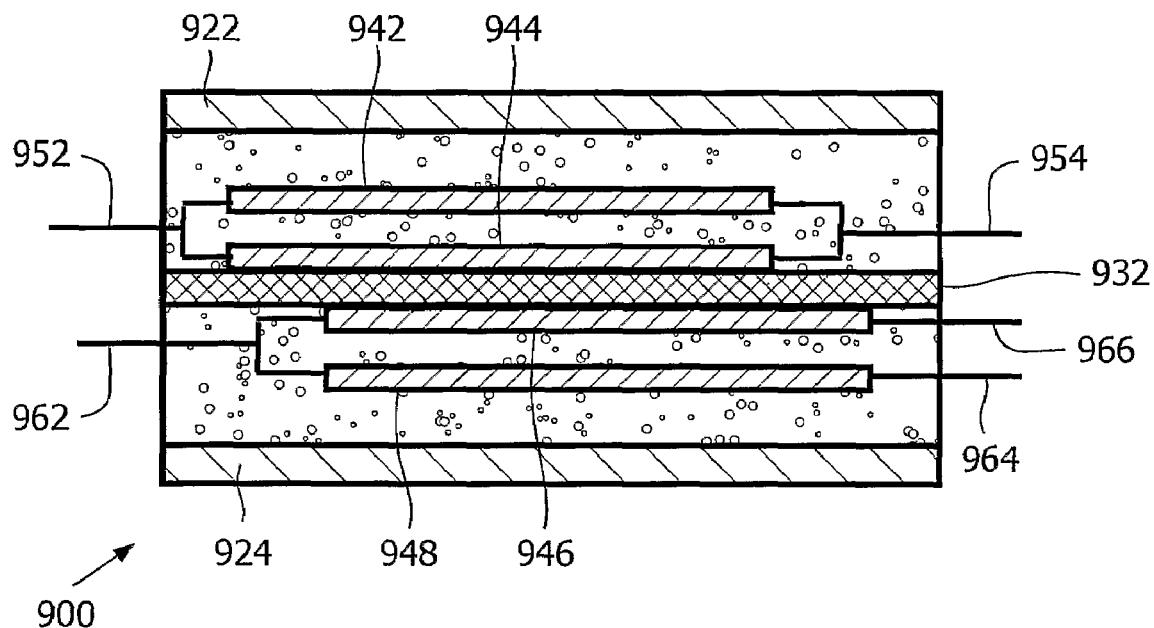
FIG. 9 is a cross sectional view of a printed circuit board with an integrated transformer.

Turning now to FIG. 9, the integration of passive components in circuits of power electronics is described. One approach pursues the development of technologies for integration of these components in the printed circuit board. A higher packaging density, a faster production process due to integral manufacturing, and improved thermal characteristics are the advantages of this approach. The other approach focuses on the development of complex components incorporating various electrical functions, i.e. the integration of capacitive and inductive characteristics in one component. The resulting advantages are a small number of components and a reduction of size of the circuit. Combination of both approaches leads to a even higher level of integration. Accordingly, all types of passive components are preferably integrated in the PCB. Passive components are components that are not semiconductors. They comprise resistors, capacitors, or inductances and the transformer. This translates to a simultaneous manufacturing of many components in one step of the manufacturing process. The integral manufacturing is achieved by means of a manufacturing process in layers, wherein each layer comprises many similar components. Various layers are composed to an entire circuit, which leads to a three-dimensional structure of the circuit.

The transformer as the largest component in a power supply is constructed with its windings integrated in the printed circuit board (PCB) 900. This makes a very thin solution possible. The transformer comprises a primary winding. This primary winding comprises two conductors 942 and 944, which are connected in parallel. Conductors 942 and 944 present two terminals 952 and 954 for electrically connecting the primary winding to an external circuit. The secondary winding is represented beneath the primary winding and comprises two conductors 946 and 948. Conductors 946 and 948 comprise terminals 962, 964, and 966 for electrically connecting the secondary winding to an external circuit. At the side of terminal 962, both conductors are electrically connected to each other so that terminal 962 serves both conductors 946 and 948. At the opposing side, however, each of the conductors 946 and 948 presents an individual terminal 964 and 966, respectively. This arrangement forms a center tap of the secondary winding in the form of terminal 962. An insulation 932 between the primary and the secondary winding ensures mains insulation according to the standards. Accordingly, either a creepage distance of 6 mm (or 8 mm, depending on the application environment) or a solid PCB layer of at least 0.4 mm thickness must be inserted between conducting parts of the primary and the secondary side. It has to be noted that most of all soft magnetic materials that are technically relevant are "conducting" in the sense of the safety standards. Soft magnetic layers 922 and 924 form an open magnetic circuit. If the transformer core would consist of a closed soft magnetic circuit, its parts on the top side and the bottom side 922, 924 would be connected electrically, therefore possibly creating a creepage path from the primary winding to the secondary winding. This can be avoided if the core halves are separated by the PCB 900, like in the use of soft magnetic tiles. The insulation distance however leads to gaps in the magnetic path. The resulting reduction of inductivity makes a certain circuit topology and the use of higher switching frequencies necessary. In this example, PCB 900 comprises a single layer for a planar transformer for the sake of clarity of the description. Yet, it should be understood that PCB 900 may comprises further layers for e.g. capacitors, inductances, and resistors, which may be located above or beneath the transformer layer.

The soft magnetic transformer core is made from two ferrite tiles. This has two advantages: It is an easy to manufacture shape, which is important, because the sintered ferrite is brittle. A simple plate-like tile can be made thinner than a complicated shaped core. In this way, a thickness of 3 mm for the total transformer can be achieved. The second reason to use soft magnetic tiles for the ferrite core is an easy realization of the mains insulation as explained above.

In a further realization the magnetic core is made from a ferrite polymer compound material which is laminated to the printed circuit board, similar as described in the patent application US 2003/0030533. Timing capacitors, filter capacitors and other capacitors may be integrated in the printed circuit board as separate layers, as well.

Figure 10:
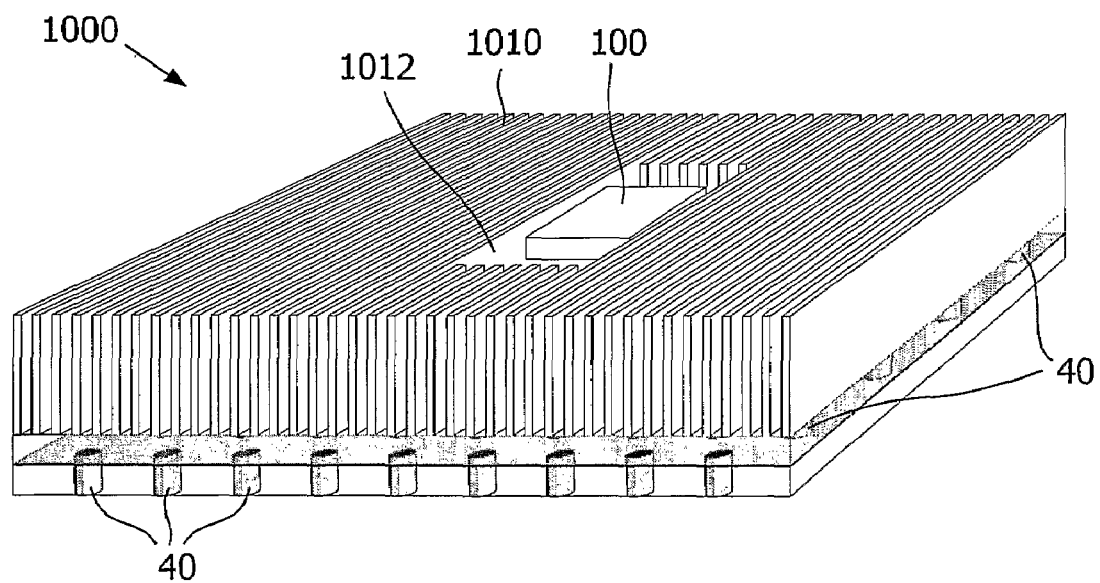
FIG. 10 shows a perspective view of a Large Area Light Source according to the invention.

FIG. 10 shows a perspective view of a Large Area Light Source (LALS) Lamp 1000 according to the invention. The LALS lamp 1000 is shown with its rear side up. A power converter 100 according to the invention is inserted in a cavity 1012 of a heat sink 1010. The heat sink 1010 is formed by several cooling fins, which assure an efficient heat dissipation. Other forms of heat sinks, such as large surfaces to the sides of the LALS lamp are also imaginable. Light emitting diodes (LED) 40 serve as illuminants. These are typically connected in series at the output of the power converter 100. LEDs 40 are represented in this drawing as cylinders to indicate their location. Their actual shape may vary. Since LEDs usually have a directional light emission characteristic, reflectors and/or diffusors (not represented) can be used for a uniform light distribution. The lower surface of the heat sink 1010 is represented semi-transparent, so that the LEDs are visible.

The invention claimed is:

1. Power converter for receiving an input current at an input voltage and for providing an output current at an output voltage, said power converter comprising:

a transformer having a primary winding and at least one secondary winding, wherein the primary and secondary windings are integrated in a printed circuit board (PCB) in a planar manner, wherein the PCB is mounted to a first side of a heat sink, the transformer showing a mutual inductivity $L_m$ and a leakage inductivity $L_{si}$ at least one switching device being operated at an operating frequency $f_{op}$ at the primary side of said transformer; and a capacitor $C_s$ at the primary side of said transformer, said capacitor forming a resonant circuit with said leakage inductivity $L_s$ of said transformer, wherein said operating frequency, said capacitor $C_s$, said mutual inductivity $L_m$ and said leakage inductivity $L_s$ are matched such that the effective value of the output current is substantially constant with respect to variations of a load being traversed by said output current, and wherein the PCB is thermally coupled to the first side of the heat sink, and a load of the power converter includes a plurality of light emitting diodes thermally coupled to a second side of the heat sink.

2. Power converter according to claim 1, wherein said operating frequency $f_{op}$, said capacitor $C_s$, and said leakage inductivity $L_s$ are matched according to a lower bound for the operating frequency being a basic resonance frequency defined by the series capacitor and the sum of the mutual inductivity $L_m$ and the leakage inductivity $L_s$, such that $$f_{op} > \frac{1}{2\pi} \frac{1}{\sqrt{(L_m + L_s)C_s}}.$$

3. Power converter according to claim 1, wherein said operating frequency $f_{op}$, said capacitor $C_s$, and said leakage inductivity $L_s$ matched according to an upper bound for said operating frequency at which an output impedance of said resonant circuit is substantially matched to said load.

4. Power converter according to claim 1, wherein said operating frequency $f_{op}$, said capacitor $C_s$, and said leakage inductivity $L_s$ are matched according to an upper bound for said operating frequency, such that $$f_{op} < \frac{1}{2\pi} \frac{1}{\sqrt{L_s C_s}}.$$

5. Power converter according to claim 1, wherein said leakage inductivity $L_s$ is realized by different dimensions of a primary and a secondary spiral winding of said transformer.

6. Power converter according to claim 1, wherein said power converter is mounted in a groove formed at the first side of the heat sink.

7. Large Area Light Source (LALS) lamp comprising a power converter according to claim 1.

8. Power converter according to claim 1, wherein the operating frequency is chosen substantially higher than a series resonance frequency defined by the series capacitor and the leakage inductivity $L_s$ as $$f_s = \frac{1}{2\pi} \frac{1}{\sqrt{L_s C_s}},$$

such that the leakage inductivity $L_s$ limits said output current.

9. Power converter according to claim 8, wherein said operating frequency $f_{op}$, said capacitor $C_s$, and said leakage inductivity $L_s$ are matched such that an input impedance of said resonant circuit presents an inductive character.

10. Power converter according to claim 1, wherein said transformer is a planar transformer.

11. Power converter according to claim 10, wherein said leakage inductivity $L_s$ is realized by shifting the center of a spiral primary winding of said transformer with respect to the center of a spiral secondary winding of said transformer.

12. Power converter according to claim 10, wherein said leakage inductivity $L_s$ is realized as a combination of shifting the centers of a primary and a secondary winding with respect to each other, and of different dimensioning of said primary and secondary windings.

13. Power converter according to claim 1, further comprising
a first AC-to-DC rectifier connectable to an AC mains supply;
a second AC-to-DC rectifier connectable to an electric consumer.

14. Power converter according to claim 13, wherein said first AC-to-DC rectifier produces a rectified voltage and a superposed ripple voltage, said ripple voltage having a frequency that is the double of the frequency of the voltage of said AC mains supply.

15. Power converter according to 13, wherein the current drawn by said first AC-to-DC rectifier from said AC mains supply is substantially sinusoidal with a frequency equal to the frequency of the voltage of said AC mains supply.

16. Power converter according to claim 13, wherein said electric consumer has a diode-like current-voltage characteristic.

17. Power converter according to claim 1, wherein a solid PCB layer is disposed between said primary and secondary windings.

18. Power converter according to claim 17, wherein said capacitor $C_s$ is integrated in the PCB.

19. Power converter according to claim 17, wherein said PCB is mounted directly to said heat sink.

20. Power converter according to claim 17, wherein said PCB is made from a thermally highly conducting material.

21. Power converter according to claim 17, wherein capacitors having high nominal values are avoided.

22. Power converter according to claim 17, wherein planar magnetic cores are disposed adjacent to the flat side of the arrangement consisting of primary windings, solid PCB layer, and secondary winding.

23. Power converter according to claim 22, wherein said planar magnetic cores consist of ferrite tiles.

24. Power converter according to claim 22, wherein said magnetic cores are made from amorphous iron.

25. Power converter according to claim 22, wherein said magnetic cores are made from nanocrystalline iron.

26. Power converter according to claim 22, wherein the magnetic cores are structured by providing slots in the magnetic cores, said slots being parallel to magnetic field lines guided within the magnetic cores.

27. Power converter according to claim 22, wherein said magnetic cores are formed by highly permeable metal foil.

28. Power converter according to claim 27, wherein said highly permeable metal foil is made of NiFe or a mu-metal.

29. Large area light source comprising light emitting diodes as illuminants and comprising a power converter for receiving an input current at an input voltage and for providing an output current at an output voltage, said power converter comprising:
a transformer having a primary winding and at least one secondary winding, wherein the primary and secondary windings are integrated in a printed circuit board (PCB) in a planar manner, wherein the PCB is mounted to a first side of a heat sink, the transformer showing a mutual inductivity $L_m$ and a leakage inductivity $L_s$; and a least one switching device being operated at an operating frequency $f_{op}$ at the primary side of said transformer; and a capacitor Cs at the primary side of said transformer, said capacitor forming a resonant circuit with the leakage inductivity Ls of said transformer, wherein the PCB is thermally coupled to the first side of the heat sink, and wherein a load of the power converter includes the light emitting diodes, the load thermally coupled to a second side of the heat sink.

30. Large area light source according to claim 29, wherein said capacitor Cs is integrated in the PCB.

31. Large area light source according to claim 29, wherein said power converter is mounted in a groove formed at the first side of the heat sink.

32. Large area light source according to claim 31, wherein said PCB is mounted directly to said heat sink.

33. Large area light source according to claim 29, wherein said transformer is a planar transformer.

34. Large area light source according to claim 33, wherein a solid PCB layer is disposed between said primary and secondary windings.

35. Large area light source according to claim 34, wherein planar magnetic cores are disposed adjacent to the flat side of the arrangement consisting of primary winding, PCB and secondary winding.

* * * * *